US010728266B2

(12) United States Patent
Chailytko

(10) Patent No.: US 10,728,266 B2
(45) Date of Patent: Jul. 28, 2020

(54) METHODS AND SYSTEMS FOR IDENTIFYING MALWARE ENABLED BY AUTOMATICALLY GENERATED DOMAIN NAMES

(71) Applicant: CHECK POINT SOFTWARE TECHNOLOGIES LTD., Tel Aviv (IL)

(72) Inventor: Aliaksandr Chailytko, Minsk (BY)

(73) Assignee: CHECK POINT SOFTWARE TECHNOLOGIES LTD., Tel Aviv (IL)

( * ) Notice: Subject to any disclaimer, the term of this patent is extended or adjusted under 35 U.S.C. 154(b) by 228 days.

(21) Appl. No.: 15/677,084

(22) Filed: Aug. 15, 2017

(65) Prior Publication Data
US 2019/0058717 A1 Feb. 21, 2019

(51) Int. Cl.
*H04L 29/06* (2006.01)
*H04L 29/12* (2006.01)

(52) U.S. Cl.
CPC ...... *H04L 63/1425* (2013.01); *H04L 61/3025* (2013.01); *H04L 63/145* (2013.01); *H04L 61/1511* (2013.01); *H04L 2463/144* (2013.01)

(58) Field of Classification Search
CPC .................. H04L 63/1425; H04L 61/3025
See application file for complete search history.

(56) References Cited

U.S. PATENT DOCUMENTS 9,805,193 B1 * 10/2017 Salsamendi ........... G06F 21/566
9,942,032 B1 *  4/2018 Kornaropoulos ....... H04L 9/008

* cited by examiner

*Primary Examiner* — Noura Zoubair
(74) *Attorney, Agent, or Firm* — Mark M. Friedman

(57) ABSTRACT

Computerized methods and systems identify malware enabled by automatically generated domain names. An agent executes a malware, in a controlled environment, at a first temporal input value and a second temporal input value. A first set of domain names is generated in response to the execution at the first temporal input value. A second set of domain names is generated in response to the execution at the second temporal input value. The agent compares the first set of domain names with the second set of domain names to produce a comparison output metric.

19 Claims, 4 Drawing Sheets

METHODS AND SYSTEMS FOR IDENTIFYING MALWARE ENABLED BY AUTOMATICALLY GENERATED DOMAIN NAMES

TECHNICAL FIELD

The present invention relates to methods and systems for identifying malware.

BACKGROUND OF THE INVENTION

Malware is any software used to disrupt computer operations, gather sensitive information, or gain access to private assets residing in computer systems. This can lead to the malware creator or other unauthorized parties gaining access to the computer system and private information stored on the computer system being compromised. Malware includes computer viruses, worms, trojan horses, spyware, adware, key loggers, and other malicious programs. These programs can appear in the form of computerized code, scripts, and other software.

Certain forms of malware, for example, collections of malicious software agents (referred to as robots) which collectively form a "botnet", are remotely controlled by the malware originator through various means (e.g., Internet Relay Chat or IRC) from a command and control (C&C) server. Each robot (or bot) runs autonomously and automatically on infected endpoint clients, and propagates malicious content to other endpoint clients, all while being maintained under the malware originator control by communicating with the C&C server. Software, such as, for example, anti-virus, anti-spyware, anti-malware and firewalls, are depended upon by computer users for protecting against malware and other malicious attacks. These types of protective software also help to identify malware attacks and take protective actions in response to identification of a malware attack, and can employ tools to identify the C&C server to prevent endpoint clients from accessing domain names linked with the C&C server to interrupt the malware originator control and prevent the spread of malware infection. However, many malware originators have begun exploiting dynamic domain name generation methods in order to make it more difficult for protective software to identify C&C servers. Domain generation algorithm (DGA) enabled malware, for example, utilize algorithms which periodically generate a large number of domain names which are used as rendezvous points with the C&C server of the malware. In operation, the infected machines (i.e., bots) and the current C&C server execute the same portions of date/time dependent malware code to maintain connectivity between the dynamically changing C&C server and the infected machines. The domain names are pseudo-randomly generated using the date and/or time (e.g., UNIX date and/or time) on an infected machine (e.g., compromised endpoint) as input. For example, a DGA enabled malware may be configured to generate a first set of domain names on Jan. 1, 2015, and a different set of domain names on Feb. 1, 2015. By periodically changing the rendezvous points, and the C&C server itself, the C&C server can avoid identification, and the infected machines (i.e., bots) can continue to receive commands from the dynamically changing C&C server.

SUMMARY OF THE INVENTION

The present invention is directed to computerized methods and systems, which identify malware enabled by automatically generated domain names.

Embodiments of the present invention are directed to a method for identifying malware enabled by automatically generated domain names. The method comprises: executing a malware, in a controlled environment, at a first temporal execution input value and a second temporal execution input value; and comparing a first set of domain names, generated in response to the execution at the first temporal execution input value, with a second set of domain names, generated in response to the execution at the second temporal execution input value, to produce a comparison output metric.

Optionally, the method further comprises: storing the domain names of the first and second set of domain names.

Optionally, the method further comprises: classifying the malware as being enabled by automatically generated domain names if the comparison output metric satisfies a threshold criterion.

Optionally, the method further comprises: executing the malware at a subsequent temporal execution input value to generate a subsequent set of domain names; and storing the domain names of the subsequent set of domain names.

Optionally, the method further comprises: repeating the executing the malware at the subsequent temporal execution input value, and the storing the domain names of the subsequent set of domain names, until a temporal execution input value criterion is satisfied.

Optionally, the storing of the domain names includes blacklisting at least a subset of the generated domain names.

Optionally, the executing the malware at the second temporal execution input value is performed if the number of domain names in the first set of domain names satisfies a threshold criterion.

Optionally, the method further comprises: generating the first set of domain names.

Optionally, the method further comprises: generating the second set of domain names if the number of domain names in the first set of domain names satisfies a threshold criterion.

Optionally, the controlled environment is a sandbox.

Optionally, the first temporal execution input value includes a first date, and wherein the second temporal execution input value includes a second date that is subsequent from the first date.

Optionally, the second date is at least six months temporally after the first date.

Optionally, the malware is obtained from an existing malware.

Embodiments of the present invention are directed to a computer system for identifying malware enabled by automatically generated domain names. The computer system comprises: a storage medium for storing computer components; and a computerized processor for executing the computer components in a controlled environment. The computer components comprise: a computer module configured for: executing a malware at a first temporal execution input value and a second temporal execution input value; and comparing a first set of domain names generated in response to the execution at the first temporal execution input value with a second set of domain names generated in response to the execution at the second temporal execution input value to produce a comparison output metric.

Optionally, the controlled environment is a sandbox.

Embodiments of the present invention are directed to a method for identifying malware enabled by automatically generated domain names. The method comprises: generating a first set of domain names in response to execution of a malware, in a controlled environment, at a first temporal input value; generating a second set of domain names in response to execution of the malware, in the controlled environment, at a second temporal input value that is subsequent from the first temporal input value, and comparing the first set of domain names with the second set of domain names to produce a comparison output metric.

Optionally, the method further comprises: classifying the malware as being enabled by automatically generated domain names if the comparison output metric satisfies a threshold criterion.

Optionally, generating a subsequent set of domain names in response to execution of the malware at a subsequent temporal input value.

Optionally, the second set of domain names is generated if the number of domain names in the first set of domain names satisfies a threshold criterion.

Optionally, obtaining the malware from an existing malware, the malware receiving temporal values as input for execution.

This document references terms that are used consistently or interchangeably herein. These terms, including variations thereof, are as follows:

A "computer" includes machines, computers and computing or computer systems (for example, physically separate locations or devices), servers, computer and computerized devices, processors, processing systems, computing cores (for example, shared devices), virtual machines, and similar systems, workstations, modules and combinations of the aforementioned. The aforementioned "computer" may be in various types, such as a personal computer (e.g. laptop, desktop, tablet computer), or any type of computing device, including mobile devices that can be readily transported from one location to another location (e.g. smartphone, personal digital assistant (PDA), mobile telephone or cellular telephone).

A "sandbox" includes any security mechanism which separates running programs which can be used to execute, for example, untrusted programs from untrusted sources. The aforementioned "sandbox" employs tightly controlled resources, providing space for programs to be executed in an isolated controlled environment, and may include any application, applet, or other type of self-contained program that runs on a computer, virtual machine or scripting language interpreter. The aforementioned "sandbox" can provide capability to mimic or emulate host computers or computer systems on which conventional operating systems boot and run as on actual hardware, and may additionally emulate computer hardware, browsers or other characteristics of such computers or computer systems.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DESCRIPTION OF THE PREFERRED EMBODIMENTS

Figure 1:
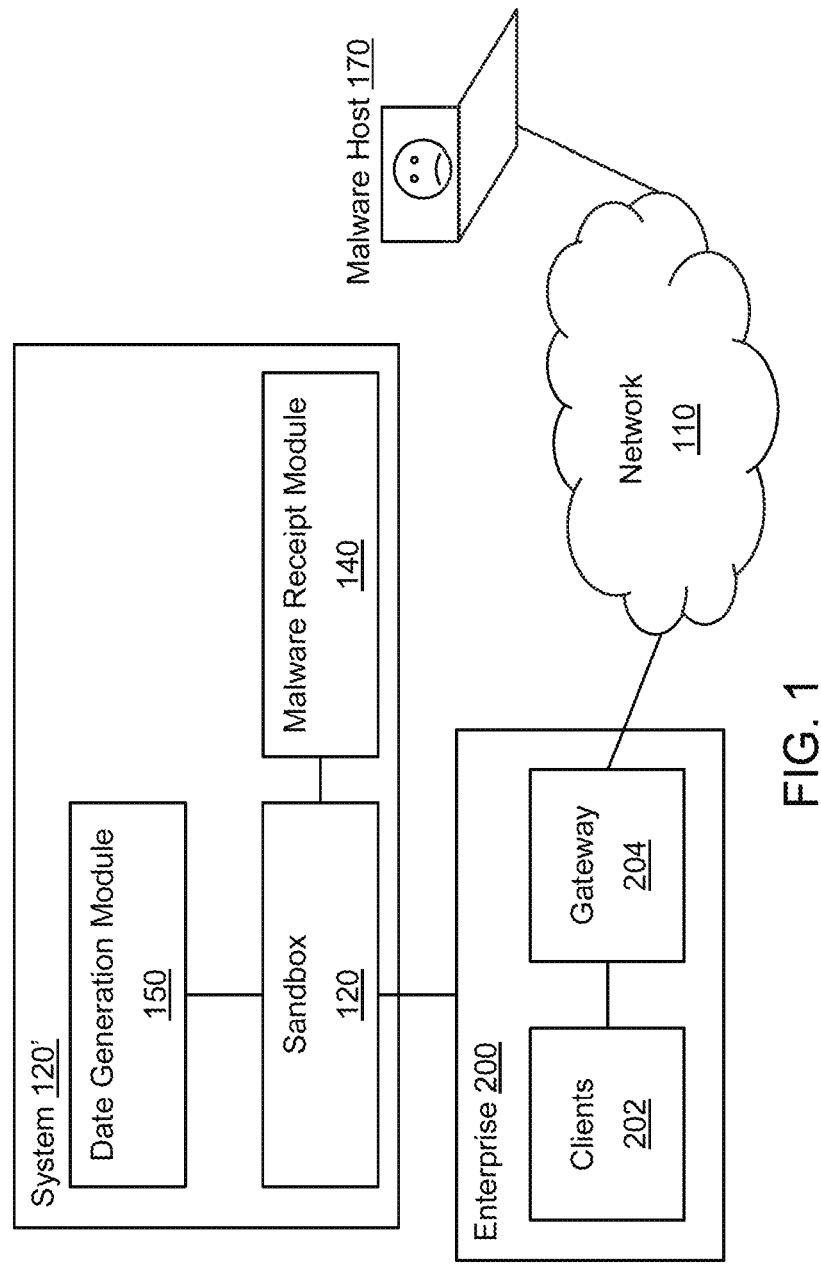
FIG. 1 is a diagram illustrating a system environment in which an embodiment of the invention is deployed.

The present invention is directed to computerized methods and systems, which identify malware enabled by automatically generated domain names. A sandbox receives malware, for example, samples of existing malware programs. The sandbox receives the malware via, for example, a malware receipt module. The sandbox emulates a networked environment (e.g., the Internet) by executing the malware in a controlled environment via a malware execution and identification agent. If the malware is enabled by automatically generated domain names, the malware, when executed at a first temporal input value (e.g., a date and/or time), generates enough unique domain names in response to the execution to satisfy a threshold criterion. For each generated domain name, a domain name resolve request is sent to a custom DNS server, emulating the domain name generation and resolving that is typically performed over the Internet. The temporal input value is advanced, and the malware is executed at the new temporal input value. In response to the execution at the new temporal input value, new domain names are generated, and domain name resolve requests are again provided to the custom DNS server. The domain names generated in response to the execution of the malware at the first temporal input value are compared with the domain names generated in response to the execution of the malware at the new temporal input value to produce a comparison output metric, for example an amount of overlap between the two sets of generated domain names. If the output metric satisfies a threshold criterion (e.g., if the amount of overlap is greater than a threshold value), the identification of the malware is confirmed as being enabled by automatically generated domain names. The temporal input value advancement and domain name generation process is repeated until a target temporal input value is reached, which may be temporally before or after the second temporal input value. Once the target temporal input value is reached, all of the generated domain names are stored, for example in a database, for potential blacklisting, which can be provided to a gateway, a firewall, or endpoint clients of an enterprise system.

Within the context of this document, the term "DGA enabled malware" generally refers to any malware that operates by automatically generating multiple domain names in order to periodically and dynamically change the C&C server.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

Refer now to FIG. 1, an illustrative example environment in which embodiments of the present disclosure may be performed. In principle, the embodiments of the present disclosure may be employed to provide a layer of protection to one or more endpoint clients 202 (e.g., user computers) of an enterprise 200 that is linked to a network 110, by supplying information to a gateway 204, or other network device of the enterprise 200, deployed between the endpoint clients 202 and the network 110. The gateway 204 may perform firewall functions to protect the endpoint clients 202 from malware infection by preventing access to websites associated with restricted domain names. The network 110 may be formed of one or more networks, including for example, the Internet, cellular networks, wide area, public, and local networks.

The embodiments include a system 120' (FIGS. 1 and 2), including, for example, a sandbox 120, which as shown in the example environment of FIG. 1, may be linked to the enterprise 200. Although not shown in the drawings, the connection between the system 120' and the enterprise 200 may be provided via a private network, such as, for example, an Intranet. The sandbox 120 includes a malware execution and identification agent 130 that identifies whether malwares executed by the agent 130 are enabled by automatically generated domain names, and optionally classifies the type of malwares that are enabled by automatically generated domain names.

In the absence of the system 120', the endpoint clients 202 of the enterprise 200 are susceptible to malware infection and control from a malware host 170, also linked to the network 110. As is known in the art, infection of one or more of the endpoint clients 202 by the malware host 170 may be facilitated, for example, by the creation of a malicious file by the malware host 170, that when executed, calls a malware process. The malicious file may be made available to a host server (not shown), linked to the network 110, by the malware host 170. Such a host server may represent numerous servers hosting, for example, web sites, accessible through web servers (not shown), and electronic mail (i.e., e-mail) clients accessible through e-mail servers.

The malware execution and identification agent 130 includes software, software routines, code, code segments and the like, embodied, for example, in computer components, modules and the like, that are installed on machines, such as the sandbox 120. For example, the malware execution and identification agent 130 performs an action when a specified event occurs, as will be further detailed below.

Figure 2:
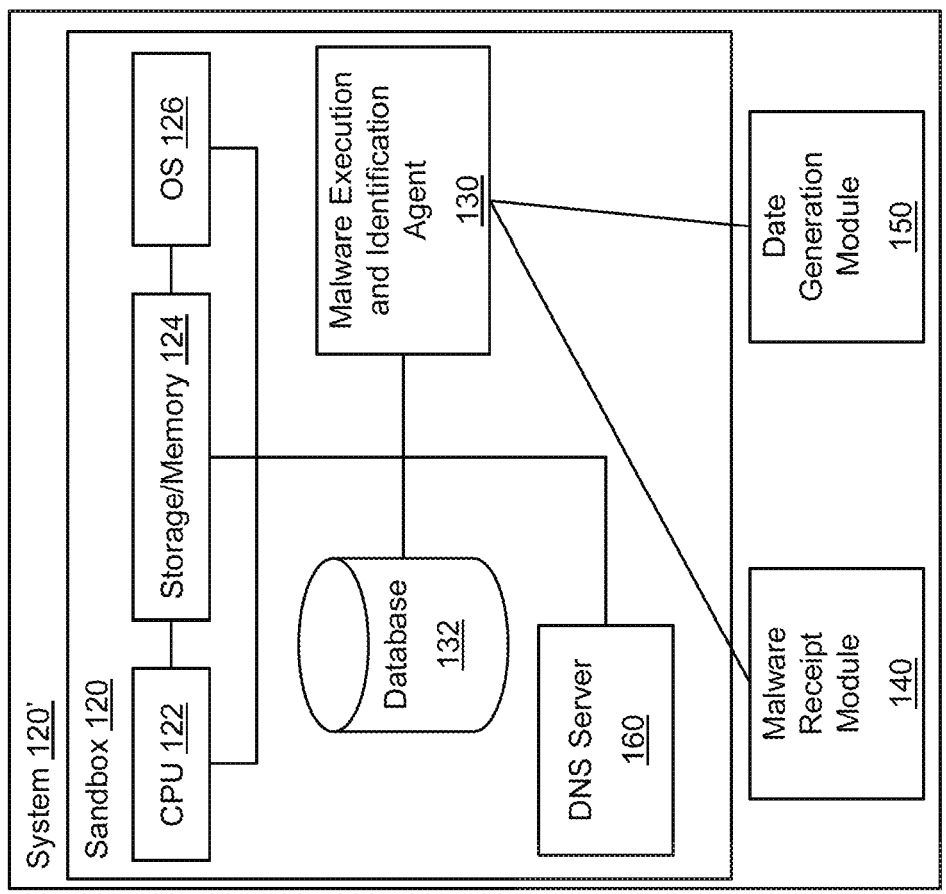
FIG. 2 is a diagram of the architecture of an exemplary system embodying the invention.

FIG. 2 shows the system 120' and the sandbox 120 therein, as an architecture, with the malware execution and identification agent 130 incorporated into the sandbox 120 of the system 120'. The system 120' is referred to as "the system" in the description of FIG. 4 below. All components of the sandbox 120 and/or the system 120' are connected or linked to each other (electronically and/or data), either directly or indirectly.

The sandbox 120 includes a central processing unit (CPU) 122, a storage/memory 124, and an operating system (OS) 126. The processors of the CPU 122 and the storage/memory 124, although shown as a single component for representative purposes, may be multiple components.

Figure 4:
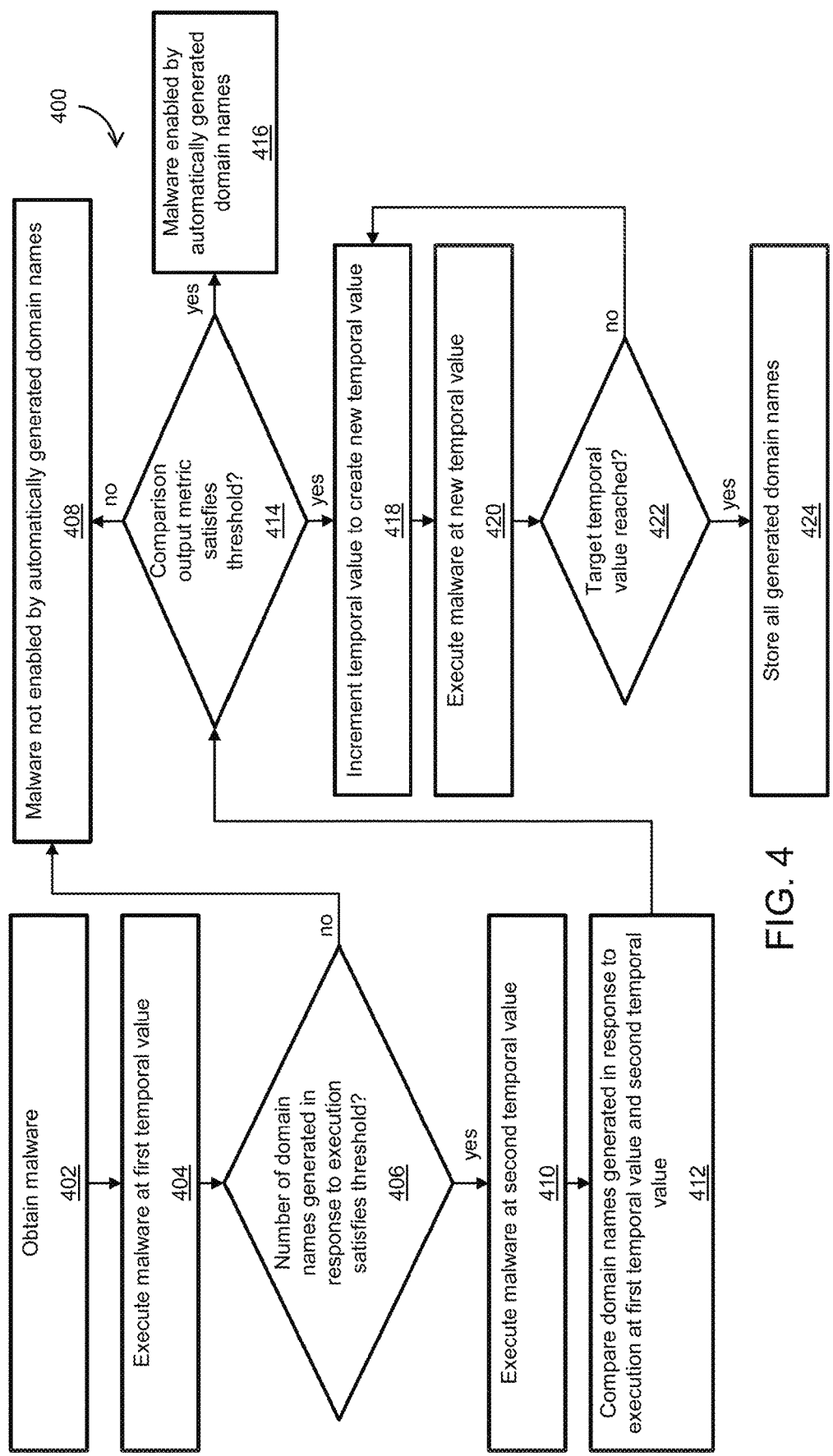
FIG. 4 is a flow diagram illustrating a process to identify malware enabled by automatically generated domain names according to an embodiment of the invention.

The CPU 122 is formed of one or more processors, including microprocessors, for performing the sandbox 120 functions, including executing the functionalities and operations of the malware execution and identification agent 130, as detailed herein, the OS 126, and including the processes shown and described in the flow diagram of FIG. 4. The processors are, for example, conventional processors, such as those used in servers, computers, and other computerized devices. For example, the processors may include x86 Processors from AMD and Intel, Xeon® and Pentium® processors from Intel, as well as any combinations thereof.

The storage/memory 124 is any conventional storage media. The storage/memory 124 stores machine executable instructions for execution by the CPU 122, to perform the processes of the present embodiments. The storage/memory 124 also includes machine executable instructions associated with the operation of the components, including the malware execution and identification agent 130, and all instructions for executing the processes of FIG. 4, detailed herein.

The OS 126 may include any of the conventional computer operating systems, such as those available from Microsoft of Redmond Wash., commercially available as Windows® OS, such as Windows® XP, Windows® 7, MAC OS from Apple of Cupertino, Calif., or Linux, or may include real-time operating systems, or may include any other type of operating system typically deployed in sandboxed systems as known in the art.

The system 120' further includes a database 132, a custom DNS server 160, a malware receipt module 140, and a date generation module 150. The database 132 and the DNS server 160 may be included as part of the environment of the sandbox 120. Although the modules 140 and 150 are shown as being external to the environment of the sandbox 120, as illustrated in FIGS. 1 and 2, either or both of the modules 140 and 150 may be included as part of the sandbox 120.

The database 132 may be used to store and retain a listing of dynamically generated domain names that are generated in response to execution of malwares by the malware execution and identification agent 130, as will be discussed in subsequent sections of the present disclosure.

The malware receipt module 140 performs functions to retrieve malwares, for example, samples of existing malware programs. The malware receipt module 140, although depicted in FIGS. 1 and 2 as being directly included as part of the system 120', may be a separate and/or remote module that retrieves malwares, and provides malwares to the system 120' through indirect channels or mediums. The malware receipt module 140 preferably obtains malwares from high volume feeds, which may be linked to the network 110 or a different network. The connection to high volume feeds allows the malware receipt module 140, and therefore the system 120', to obtain up to date malwares and malware samples of current malware programs.

The date generation module 150 performs functions to generated dates and/or times according to programmed input requests which may be set by operators of the system 120'. As mentioned above, since DGA enabled malware generates domain names based on the date/time of the infected endpoint, the date generation module 150 allows the system 120' to execute malware at variable dates and/or times. For example, the date generation module 150 may generate a sequence of dates and/or times over a defined interval, which may include future dates (e.g., Jan. 1, 2020, Jan. 2, 2020 . . . , Mar. 1, 2020). Accordingly, the date generation module 150 generates one or more temporal input values. The date generation module 150 may generate the temporal input values in a variety of ways. For example, the date generation module 150 may generate a predefined number of temporal input values beginning at an initial value and sequentially advancing to an end value at equal or non-equal increments. According to certain embodiments, the initial value is the current date/time of the system 120' when the malware is first executed, and the remaining generated temporal input values are future dates/times incremented from the initial value. The temporal input values may be generated in a single shot and stored in a storage medium (e.g., the storage/memory 124) to be retrieved at a later execution, or may be generated one by one in response to requests issued by the malware execution and identification agent 130.

The malware receipt module 140 and the date generation module 150 may be implemented as hardware, firmware and/or software. In the exemplary system 120' of embodiments of the present disclosure, the modules 140 and 150 are, for example, implemented as software, and implemented as executable code that is stored in a non-volatile memory, such as, for example, the storage/memory 124 of the sandbox 120, and executed by a processor, such as, for example the CPU 122 of the sandbox 120. It is noted that each of the modules 140 and 150 may include a dedicated non-volatile memory for storing executable code, and a dedicated processor for executing the code stored in the dedicated on-volatile memory.

The custom DNS server 160 emulates the functions and operations performed by common DNS servers in network environments by receiving domain name resolve requests in response to the execution of malware by the system 120' at different generated dates/times by the date generation module 150. In this way, the custom DNS server emulates the domain name generation and resolving process that is typically performed over the Internet between endpoint clients and DNS servers.

The custom DNS server 160 may be implemented as hardware, firmware and/or software. In the exemplary system 120' of embodiments of the present disclosure, the custom DNS server 160 is, for example, implemented as software, and implemented as executable code that is stored in a non-volatile memory, such as, for example, the storage/memory 124 of the sandbox 120, and executed by a processor, such as, for example the CPU 122 of the sandbox 120. It is noted that each of the custom DNS server 160 may include a dedicated non-volatile memory for storing executable code, and a dedicated processor for executing the code stored in the dedicated on-volatile memory.

In an exemplary series of processes to identify whether a malware is DGA enabled, the system 120' receives a malware, for example, from the malware receipt module 140. As previously discussed, the malware receipt module 140 receives, for example, samples of existing malware programs, preferably through high volume feeds. The malware execution and identification agent 130 executes the malware at a first temporal input value (e.g., a first date/time) that is provided by the date generation module 150. As previously discussed, one or more of the temporal input values may be generated prior to the execution of the malware by the system 120'.

In response to the execution of the malware by the system 120', the malware may cause the generation of multiple domain names, particularly when the malware is DGA enabled. The system 120' may analyze and/or check for the generation of domain names by monitoring for resolve requests sent to the custom DNS server 160, or by monitoring for resolutions initiated by the custom DNS server 160 in response to the resolve requests. The system 120' evaluates/determines/checks whether execution of the malware at the first temporal value results in generation of domain names, and specifically evaluates/determines/checks whether execution of the malware at the first temporal value results in generation of a number of unique domain names above a threshold value. According to certain preferred embodiments, the threshold value is adjustable by an operator of the system 120'.

Note that DGA enabled malwares inherently generate one or more unique domain names in response to execution at a given temporal input value. However, generation of a relatively small number of unique domain names inhibits the DGA enabled malware's ability to dynamically change the C&C server and avoid detection. Therefore, effective DGA enabled malwares typically generate eight or more unique domain names per execution at a temporal input value, and more typically fifteen or more unique domain names. As such, the aforementioned threshold value is preferably set to a value in accordance with effective DGA enabled malwares.

If the number of domain names generated in response to the malware execution by the system 120' is below the threshold value, the system 120' classifies the malware as not DGA enabled. The system 120' may task other systems and/or modules linked to the system 120' with performing further functions to analyze the non-DGA malware.

If the number of domain names generated in response to the malware execution by the system 120' is greater than or equal to the threshold value, the system 120' may temporarily classify the malware as DGA enabled, since any malware which generates a relatively large number of domain names is inherently suspected of being DGA enabled. The system 120' then increments the temporal input value to a second temporal input value. The second temporal input value is typically subsequent to the first temporal input value, and is preferably significantly subsequent to the first temporal input value. In practice, a DGA enabled malware may generate the same set of domain names over a short period of time (e.g., a several days period, a one-week period, a two-week period, or greater). Therefore, the first and second temporal input values are temporally spaced enough apart in order to ensure that if the malware is DGA enabled, two different sets of domain names will be generated in response to the execution at the two temporal input values. For example, the temporal spacing between the first and second temporal input values may be several months, and according to certain embodiments is approximately one year. For example, if the first temporal input value corresponds to a date/time of Jan. 1, 2020, the second temporal input value may correspond to a date/time of Jan. 1, 2021. The incrementing of the temporal input value may be achieved by requesting a new temporal input value from the date generation module 150, or by retrieving a next or different temporal input value from a stored list of temporal input values previously generated by the date generation module 150, as discussed above.

The malware execution and identification agent 130 then executes the malware at the second temporal input value (e.g., a second date/time). In response to the execution at the second temporal input value, the system 120' compares the set of domain names generated in response to the malware execution at the first temporal input value with the set of domain names generated in response to the malware execution at the second temporal input value. The comparison produces a comparison output metric, which the system 120' evaluates against a threshold value. If the comparison output metric satisfies a threshold criterion based on the threshold value, suspicion of the malware as being DGA enabled is confirmed, and the system 120' identifies the malware as DGA enabled. According to certain preferred embodiments, the threshold value is adjustable by an operator of the system 120'.

According to certain embodiments, the output metric is an overlap amount between the two sets of generated domain names. For example, the system 120' may generate a union set and an intersection set, where the union set is formed by the union of the domain names of the two generated sets of the domain names, and the intersection set is formed by the intersection of the domain names of the two generated sets of the domain names. The intersection set may be formed by performing a string comparison operation between individual domain names of the first set of generated domain names with individual domain names of the second set of generated domain names. The system 120' may then determine the ratio between the number of elements in the intersection set and the number of elements in the union set. The system 120' may then evaluate the ratio against an overlap percentage threshold value. As mentioned above, the threshold value against which the comparison output metric is evaluated is preferably adjustable by an operator of the system 120'. In a non-limiting example, the overlap percentage threshold value is set to 80%, but may be adjusted based on feedback from the system 120'.

If the comparison output metric satisfies the threshold criterion (i.e., if the system 120' confirms that the malware is DGA enabled), the system 120' increments the temporal input value to a next (i.e., subsequent) temporal input value, similar to as described above with respect to incrementing from the first temporal input value to the second temporal input value. The system executes the malware at the next temporal input value. The process of incrementing the temporal input value, and the execution of the malware at the incremented temporal input value, is repeated until a target temporal input value (i.e., end value) is reached. The target temporal input value is a parameterized value which may be set by an operator of the system 120'. For example, in certain non-limiting implementations the target temporal input value is set to 90 days after the first temporal input value. The termination after 90 days allows the system 120' to preemptively provide protection to machines (e.g., the endpoint clients 202), as will be described in subsequent sections of the present disclosure.

The system 120' stores (i.e., saves) the domain names generated in response to the execution of the malware at each temporal input value, including the domain names generated in response to the execution of the malware at the first and second temporal input values. The domain names may be stored as a list in the database 132 or in another storage repository or facility, such as, for example, the storage/memory 124. The system 120' may provide the stored list of generated domain names to the gateway 204. By providing the list of generated domain names to the gateway 204, the gateway 204 may actively prevent access to the generated domain names by the endpoint clients 202.

In addition to storing the generated domain names, the system 120' preferably stores the temporal input values used to generate each set of domain names, creates an association between each temporal input value and the set of domain names generated in response to each temporal input value, and stores that association. As a result, the system 120' is able to indicate which set of domain names are used to communicate with the C&C server of the DGA enabled malware on a given date/time.

Accordingly, even if one of the endpoint clients 202 is infected by DGA enabled malware, the gateway 204 can prevent communication between the infected endpoint client and the C&C server, thereby preventing data exfiltration and other harmful side effects of malware infection. The gateway 204 therefore blocks malicious communications between infected machines (e.g., the endpoint clients 202) and the C&C server, and detects the compromise of the infected machine based on network level traffic. In other words, based on the information provided to the gateway 204 (or other security systems linked to the enterprise 200) by the system 120', the gateway 204 is able to take preemptive protective actions. Such protective actions may include actions such as: 1) quarantining one or more of the endpoint clients 202, for example, by blocking the endpoint client(s) 202 from accessing the network 110, or otherwise disconnecting the endpoint client(s) 202 from the network 110 (i.e., isolating the endpoint client(s) 202 from the network 110); 2) displaying a message, warning window, or the like, on the endpoint client(s) 202, indicating the presence of infection; 3) suspending the administrative account of the user(s) of the endpoint client(s) 202, for example, by locking the endpoint client(s) 202; and 4) alerting or notifying a system administrator of the enterprise 200 about the security incident.

Figure 3:
FIG. 3 is a table illustrating the association between generated domain names and temporal input values according to an embodiment of the invention.

Refer now to FIG. 3, a table 300 illustrates the association between each temporal input value and the corresponding set of domain names generated in response to execution of the DGA enabled malware at each temporal input value. The table 300 is for example purposes only and is used to illustrate the aforementioned association between temporal input values and generated domain names. In the example of FIG. 3, the table 300 includes four temporal input values: $T_1$, $T_2$ (resultant from incrementing $T_1$), $T_3$ (resultant from incrementing $T_2$), and $T_4$ (resultant from incrementing $T_3$).

In response to execution of DGA enabled malware at $T_1$, K domain names are generated, namely $D_{1,1}, D_{1,2}, \ldots, D_{1,K}$. In response to execution of DGA enabled malware at $T_2$, L domain names are generated, namely $D_{2,1}, D_{2,2}, \ldots, D_{2,L}$. In response to execution of DGA enabled malware at $T_3$, M domain names are generated, namely $D_{3,1}, D_{3,2}, \ldots, D_{3,M}$. In response to execution of DGA enabled malware at $T_4$, N domain names are generated, namely $D_{4,1}, D_{4,2}, \ldots, D_{4,N}$. Note that the number of domain names generated at each temporal input value are not necessarily equal.

In the example of table 300, a domain name $D_{i,j}$ refers to the $j^{th}$ domain name in the set of domain names generated in response to execution of the malware at the $i^{th}$ temporal input value.

Accordingly, accessing a domain name $D_{i,j}$ on the date/time corresponding to the $i^{th}$ temporal input value, by one of the endpoint clients 202, is likely the result of the endpoint client being infected and attempting to communicate with the C&C server of the DGA enabled malware, or malware performing data exfiltration on the infected endpoint client.

Note that for a given set of generated domain names corresponding to a temporal input value, only a small subset of the domain names in the set corresponds to the C&C server for that temporal input value. The majority of the remaining domain names correspond to domain names that may transfer data to and from the C&C server, and may not necessarily resolve to a specific IP address, as they are typically not ultimately registered as domain names. The system 120' preferably blacklists all of the generated domain names, thereby preventing the endpoint clients 202 from accessing the websites and addresses associated with the malicious domain names, blocking communication between infected endpoint clients and the C&C server.

Although the majority of the domain names correspond to malicious domain names that may transfer data to and from the C&C server, a minority portion of the generated domain names may be neutralized domain names that are used by the C&C server for connectivity checks and the like. Such domain names are typically known to firewall systems, and are nonthreatening (i.e., non-malicious) domain names, such as, for example, www.google.com and www.yahoo.com. The system 120' may optionally whitelist any such known and nonthreatening domain names, thereby allowing continued access to such domain names by the endpoint clients 202.

Attention is now directed to FIG. 4 which shows a flow diagram detailing a computer-implemented process 400 in accordance with embodiments of the disclosed subject matter. This computer-implemented process includes an algorithm for identifying whether a malware is DGA enabled. Reference is also made to the elements shown in FIGS. 1-3. The process and sub-processes of FIG. 4 are computerized processes performed by the system 120' including, for example, the CPU 122 and associated components, such as the malware execution and identification agent 130, at the sandbox 120. The aforementioned processes and sub-processes are for example, performed automatically, but can be, for example, performed manually, and are performed, for example, in real time.

The process 400 begins at block 402 where the system 120', and more specifically the malware execution and identification agent 130, obtains malware, for example from the malware receipt module 140. As discussed above, the malware may be a sample of an existing malware. The process 400 then moves to block 404, where the system 120' executes the malware at a first temporal input value (e.g., a first date/time). As discussed above, the temporal input values are provided by the date generation module 150, and one or more of the temporal input values may be generated prior to the execution of the malware by the system 120'.

The process 400 then moves to block 406, where the system 120' evaluates/determines/checks whether any domain names are generated in response to the execution of the malware in block 404. In particular, the system 120' evaluates/determines/checks whether the number of unique domain names is greater than or equal to a positive threshold value (e.g., eight, fifteen, or more). If the number of domain names generated is below the positive threshold value, the process 400 moves from block 406 to block 408, where the system 120' determines that the malware is not DGA enabled. The system 120' may then forward the malware to other security modules and/or systems for further analysis of the non-DGA enabled malware. As should be apparent, if no domain names are generated, the number of generated domain names is zero, and therefore is below the positive threshold value.

If the number of domain names generated in response to the execution of the malware in block 404 is greater than or equal to the positive threshold value, the process 400 moves from block 406 to block 410. The system 120' also retains the first set of domain names generated in response to the execution of the malware in block 404. The system 120' may retain the domain names in the database 132 or other storage location, such as, for example, the storage/memory 124.

In block 410, the system 120' executes the malware at a second temporal input value (e.g., a second date/time) to generate a second set of domain names in response to the malware execution. As discussed above, the second temporal input value may be obtained by incrementing the first temporal input value, or by retrieving a next temporal input value from a stored list of temporal input values previously generated by the date generation module 150.

The process 400 then moves to block 412, where the system 120' compares the first and second sets of generated domain names to produce a comparison output metric. As discussed above, the comparison output metric may be the amount of overlap between the two sets of generated domain names.

The process 400 then moves to block 414, where the system 120' evaluates the comparison output metric against a threshold value. If the comparison output metric does not satisfy a threshold criterion derived from the threshold value, the process 400 moves from block 414 to block 408.

Returning to block 414, if the comparison output metric satisfies the threshold criterion, the process 400 moves from block 414 to blocks 416 and 418. In block 416, the system 120' positively identifies (i.e., determines) that the malware is DGA enabled. In block 418, the system 120' begins a sub-process of logging additional domain names which are generated in response to execution of the malware at future temporal input values. Note that the functions performed in blocks 416 and 418 may be performed in a single block. The sub-process of logging additional domain names may be performed by using sequential temporal input values between the first and second temporal input values, or may be performed by using sequential temporal input values subsequent from the second temporal input value.

In block 418, the system 120' increments the temporal input value to a next (i.e., subsequent) temporal input value. As mentioned above, since the second temporal input value may be approximately one year after the first temporal input value, and the target temporal input value may be approximately 90 days after the first temporal input value, the next temporal input value is preferably subsequent from (i.e., temporally after) the first temporal input value and before (i.e., temporally prior to) the second temporal input value. However, the next temporal input value may be subsequent from both the first and the second temporal input values.

The process 400 then moves to block 420, where the system 120' executes the malware at the next temporal input value to generate a new set of domain names in response to the malware execution. The process 400 then moves to block 422, where the system 120' evaluates the instant temporal input value (i.e., the last temporal input value used as input to the malware execution) against a threshold criterion. In a non-limiting implementation, the threshold criterion is a target temporal value. For example, the target temporal value may be a set number of days (e.g., 90 days) into the future from the first temporal input value.

If the temporal input value does not satisfy the threshold criterion, the process 400 moves from block 422 back to block 418. If the temporal input value satisfies the threshold criterion, the process 400 moves from block 422 to block 424, where the system 120' stores (i.e., saves) all of the domain names generated in response to execution of the malware by the system 120'. For example, referring again to the exemplary illustration of the table 300 in FIG. 3, if the fourth temporal input value $T_4$ satisfies the threshold criterion of block 422, the system 120' stores (in block 424) all four sets of generated domain names (i.e., $D_{1,1}$, $D_{1,2}$, ..., $D_{1,K}$, $D_{2,1}$, $D_{2,2}$, ..., $D_{2,L}$, $D_{3,1}$, $D_{3,2}$, ..., $D_{3,M}$, and $D_{4,1}$, $D_{4,2}$, ..., $D_{4,N}$). As previously discussed, the temporal input values are also preferably stored by the system 120' along with an association relating each set of domain names with the temporal input value that resulted in the generation of the domain names of that set.

The domain names and associated temporal input values may be stored in a structured format in the database 132, or in another repository. It is noted that instead of storing all of the sets of generated domain names upon reaching the target temporal input value, each set of generated domain names may be stored immediately after generation.

The step of storing domain names in block 424 may include sub-steps of storing a subset of the generated domain names in a blacklist (i.e., blacklisting), and storing another non-overlapping subset of the generated domain names in a whitelist (i.e., whitelisting).

As previously discussed, a small subset of the generated domain names may include non-malicious domain names relating to known websites accessible through the world wide web, www.google.com and www.yahoo.com, which may be used by the C&C server for connectivity checks, diagnostics, and the like. Therefore, the system 120' preferably whitelists any such non-malicious domain names generated in response to execution of the malware by the system 120'. The system 120' treats the remaining unknown generated domain names as malicious, and therefore blacklists such domain names. As a result of the whitelisting and blacklisting performed as part of the step of storing the domain names in block 424, the database 132 may include a whitelist of domain names and a separate blacklist of domain names. In a preferred but non-limiting implementation, the system 120' provides the blacklist to the gateway 204.

The resultant blacklist may be a dynamic blacklist, since communication by infected endpoint clients and side effects of infection (e.g., data exfiltration, etc.), via access to the blacklisted domain names, is date/time dependent. For example, referring again to the exemplary illustration of the table 300 in FIG. 3, accessing any of the domain names $D_{4,1}$, $D_{4,2}, \ldots, D_{4,N}$ at a date/time that corresponds to a temporal input value other than the fourth temporal input value $T_4$, may not necessarily be in response to commands from a C&C server, since the domain names $D_{4,1}, D_{4,2}, \ldots, D_{4,N}$ are yet to be generated by the actual malware executed in a non-sandboxed network environment. Therefore, one of the endpoint clients 202 attempting to access any of the domain names $D_{4,1}, D_{4,2}, \ldots, D_{4,N}$ at such a date/time may result in benign access to the domain names by the endpoint client. However, it is duly noted that since the domain names generated in response to the execution of the DGA enabled malware are most likely malicious domain names which are pseudo-randomly generated, any access to such domain names by an endpoint client is inherently suspicious, and therefore, the gateway 204 (or other security systems linked to the enterprise 200) preferably blocks the endpoint clients 202 from accessing all blacklisted domain names regardless on dependency of future dates/times. The dynamic aspect of the blacklist allows the system 120' to provide protection to the enterprise 200 up to a specific date/time into the future, specified by the threshold criterion of block 422.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method for identifying malware enabled by automatically generated domain names, comprising:
    executing a malware, in a controlled environment, at a first temporal execution input value and a second temporal execution input value to emulate execution of the malware on a host computer at a first future instance corresponding to the first temporal execution input value and a second future instance corresponding to the second temporal execution input value, wherein the first temporal execution input value is different from the second temporal execution input value; and
    comparing a first set of domain names, generated in response to the execution at the first temporal execution input value, with a second set of domain names, generated in response to the execution at the second temporal execution input value, to produce a comparison output metric that includes an amount of overlap between the first set of domain names and the second set of domain names, wherein the first set of domain names includes at least one domain name excluded from the second set of domain names, and wherein the second set of domain names includes at least one domain name excluded from the first set of domain names; and
    classifying the executed malware as being enabled by automatically generated domain names if the amount of overlap between the first set of domain names and the second set of domain names is greater than an overlap threshold value.

2. The method of claim 1, further comprising:
    storing the domain names of the first and second set of domain names.

3. The method of claim 1, further comprising:
    executing the malware at a subsequent temporal execution input value to generate a subsequent set of domain names; and
    storing the domain names of the subsequent set of domain names.

4. The method of claim 1, further comprising:
    repeating the executing the malware at the subsequent temporal execution input value, and the storing the domain names of the subsequent set of domain names, until a temporal execution input value criterion is satisfied.

5. The method of claim 4, wherein the storing of the domain names includes blacklisting at least a subset of the generated domain names.

6. The method of claim 1, wherein the executing the malware at the second temporal execution input value is performed if the number of domain names in the first set of domain names satisfies a threshold criterion.

7. The method of claim 1, further comprising:
generating the first set of domain names.

8. The method of claim 7, further comprising:
generating the second set of domain names if the number of domain names in the first set of domain names satisfies a threshold criterion.

9. The method of claim 1, wherein the controlled environment is a sandbox.

10. The method of claim 1, wherein the first temporal execution input value includes a first date, and wherein the second temporal execution input value includes a second date that is subsequent from the first date.

11. The method of claim 10, wherein the second date is at least six months temporally after the first date.

12. The method of claim 1, wherein the malware is obtained from an existing malware.

13. The method of claim 1, wherein the comparing includes:
generating a union set by taking the union of the first and second sets of domain names,
generating an intersection set by taking the intersection of the first and second sets of domain names, and
determining the amount of overlap between the first set of domain names and the second set of domain names by taking a ratio between a number of elements in the intersection set and a number of elements in the union set.

14. A computer system for identifying malware enabled by automatically generated domain names, comprising:
a storage medium for storing computer components; and
a computerized processor for executing the computer components in a controlled environment comprising:
a computer module configured for:
executing a malware at a first temporal execution input value and a second temporal execution input value to emulate execution of the malware on a host computer at a first future instance corresponding to the first temporal execution input value and a second future instance corresponding to the second temporal execution input value, wherein the first temporal execution input value is different from the second temporal execution input value; and
comparing a first set of domain names generated in response to the execution at the first temporal execution input value with a second set of domain names generated in response to the execution at the second temporal execution input value to produce a comparison output metric that includes an amount of overlap between the first set of domain names and the second set of domain names, wherein the first set of domain names includes at least one domain name excluded from the second set of domain names, and wherein the second set of domain names includes at least one domain name excluded from the first set of domain names; and
classifying the executed malware as being enabled by automatically generated domain names if the amount of overlap between the first set of domain names and the second set of domain names is greater than an overlap threshold value.

15. The computer system of claim 14, wherein the controlled environment is a sandbox.

16. A method for identifying malware enabled by automatically generated domain names, comprising:
generating a first set of domain names in response to execution of a malware, in a controlled environment, at a first temporal input value to emulate execution of the malware on a host computer at a first future instance corresponding to the first temporal execution input value;
generating a second set of domain names in response to execution of the malware, in the controlled environment, at a second temporal input value that is subsequent and different from the first temporal input value to emulate execution of the malware on the host computer at a second future instance corresponding to the second temporal execution input value, wherein the second future instance is subsequent to the first future instance, and wherein the first set of domain names includes at least one domain name excluded from the second set of domain names, and wherein the second set of domain names includes at least one domain name excluded from the first set of domain names;
comparing the first set of domain names with the second set of domain names to produce a comparison output metric that includes an amount of overlap between the first set of domain names and the second set of domain names; and
classifying the executed malware as being enabled by automatically generated domain names if the amount of overlap between the first set of domain names and the second set of domain names is greater than an overlap threshold value.

17. The method of claim 16, further comprising:
generating a subsequent set of domain names in response to execution of the malware at a subsequent temporal input value.

18. The method of claim 16, wherein the second set of domain names is generated if the number of domain names in the first set of domain names satisfies a threshold criterion.

19. The method of claim 16, further comprising:
obtaining the malware from an existing malware, the malware receiving temporal values as input for execution.

* * * * *